July 31, 1923.
G. SLIDER
CLUTCH MECHANISM
Filed Nov. 16, 1921
1,463,490
2 Sheets-Sheet 2
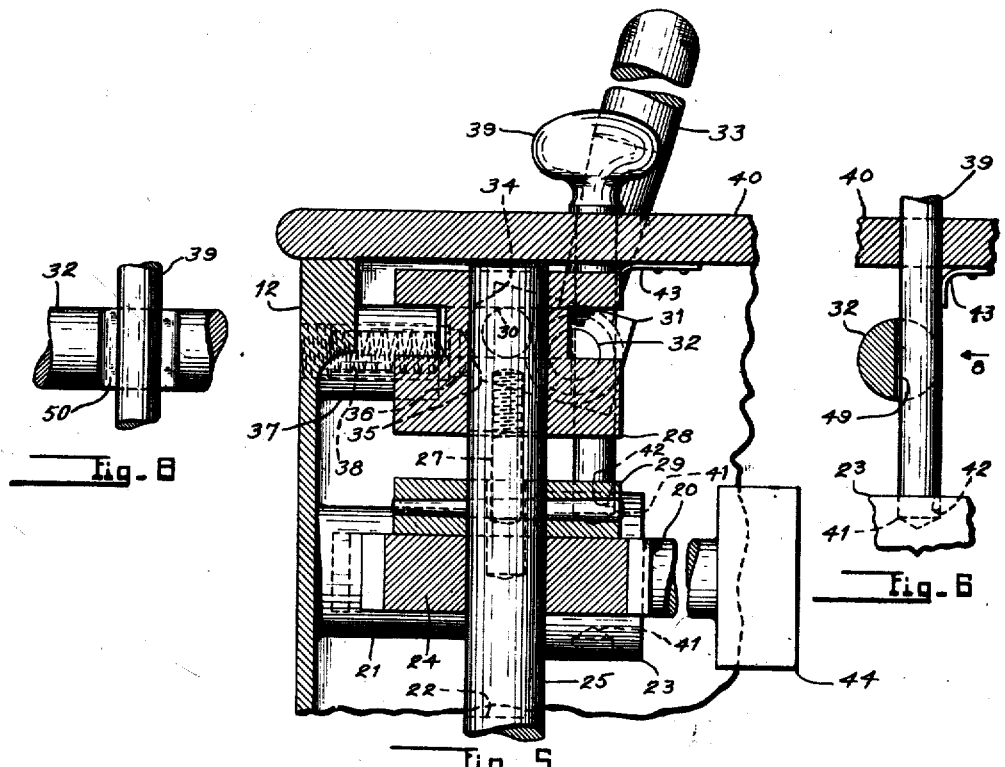
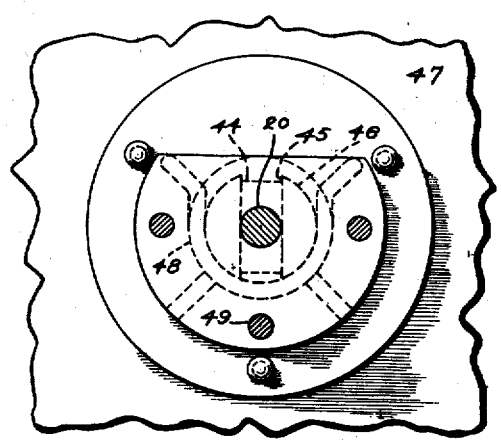
Inventor
George Slider
By John W. Lasley.
Attorney Patented July 31, 1923.

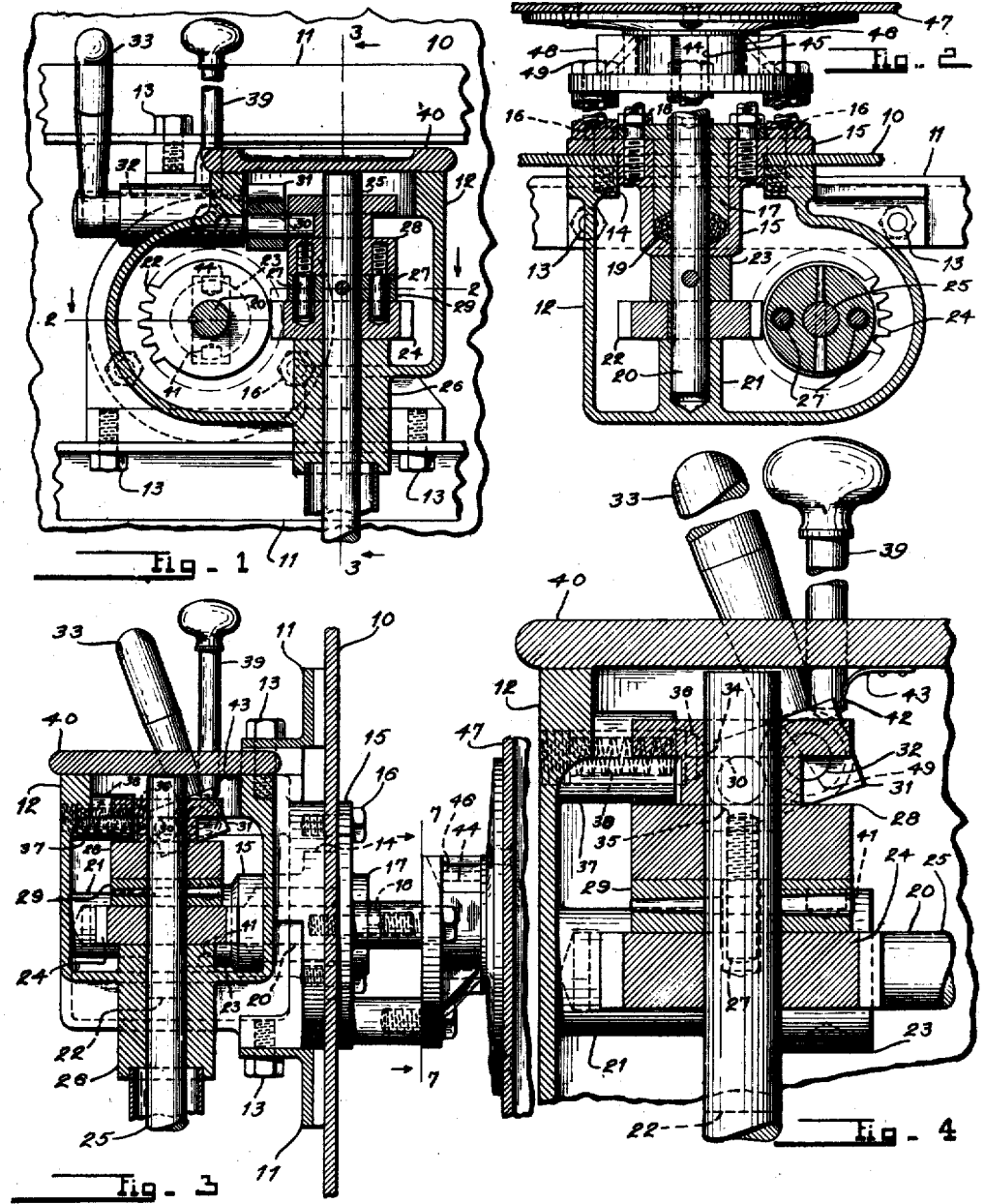

1,463,490

UNITED STATES PATENT OFFICE.

GEORGE SLIDER, OF BALTIMORE, MARYLAND.

CLUTCH MECHANISM.

Application filed November 16, 1921. Serial No. 515,496.

*To all whom it may concern:*

Be it known that I, GEORGE SLIDER, a citizen of the United States, residing at Baltimore, in the State of Maryland, have invented certain new and useful Improvements in Clutch Mechanism; and I do hereby declare the following to be a full, clear, and exact description of the invention, such as will enable others skilled in the art to which it appertains to make and use the same.

My invention relates to clutch mechanism.

Among the objects of my invention are:—

To produce a clutch mechanism suitable for use in washing machines for controlling the application of power to the clothes container thereof.

While this is the primary object of my invention, it is capable of many applications to other types of machinery and will be useful wherever it is desired to start and stop a rotating member, particularly when it is desired to stop the rotating member in definite positions.

A further object of my invention is to construct the element of the clutch mechanism which drives the clothes container so that the latter may be readily removed from connection with said element.

A further object of my invention is to provide an indexing mechanism combined with the clutch mechanism so that the clothes container of the washing machine will always be stopped in definite positions, as for instance, with the doors therein located so that the operator may have readily access to the interior of the container.

A further object of my invention is to provide an indexing mechanism combined with the clutch mechanism and the separable connection between the element of the clutch that drives the clothes container and the latter so that said element will always be stopped in such position that the separable connection can be disengaged.

These and other objects of my invention will become apparent in the following specification, reference being had to the accompanying drawings, and the means by which said objects are effectuated will be definitely pointed out in the claims.

In the drawings:—

Figure 1 is a side view partly in section showing a portion of the suds container of a washing machine with my improved clutch mechanism secured thereto.

Fig. 2 is a section along the line 2—2 in Fig. 1 looking in the direction of the arrows.

Fig. 3 is a section along the line 3—3 in Fig. 1 looking in the direction of the arrows.

Fig. 4 is an enlarged view similar to Fig. 3 and showing but a portion of the parts illustrated in Fig. 3.

Fig. 5 is a view similar to Fig. 4, but showing the handle 33 in the position in which the power is cut off from the gear 24 and the index pin 39 in engagement with one of the holes in the collar 23.

Fig. 6 shows the relation of the index pin to the shaft of the clutch handle.

Fig. 7 is a section along the line 7—7 in Fig. 3 looking in the direction of the arrows.

Fig. 8 is a view of the shifting shaft 32 and index pin 39 when viewed in the direction of the arrow 8 in Fig. 6.

In the drawings:—

10 represents a portion of the suds container of the washing machine to which the angle irons 11—11 are secured. The clutch casing 12 is secured to the angle irons by bolts such as 13 and said casing is provided with a cylindrical hole 14 which registers with a similar hole in the suds container 10.

A stuffing box 15 fits snugly within the hole 14 and the corresponding hole in the container 10. Bolts such as 16 secure said stuffing box, container and casing together.

The gland 17 fits within a hole in the stuffing box 15. Bolts such as 18 serve to press said gland against the packing 19 which prevents egress of fluid around the shaft 20 from the suds container 10 to the interior of the casing 12.

The shaft 20 has a bearing within the gland 17 and another bearing within the boss 21 formed upon the interior of the casing 12.

The spiral gear 22 and index collar 23 are secured upon the shaft 20 in any approved manner.

The gear 22 meshes with a spiral gear 24 which is loose upon the shaft 25 and the latter is revolubly mounted in a bearing in the boss 26 formed on the casing 12. The shaft 25 is to be revolved by any source of power, not shown.

The gear 24 rests upon the upper face of the boss 26 and said gear is provided with a pair of clutch holes for the reception of the clutch pins 27—27. The clutch pins 27 are secured within the clutch sleeve 28 and the latter is slidably mounted upon the shaft 25. The pins 27 extend through holes in the driving disc 29 which is secured to the shaft 25 in any approved manner. The sleeve 28 is provided with a groove for the reception of one end of the shifting pin 30, the other end of which is revolubly mounted in the shifting lever 31. The lever 31 is secured upon the shifting shaft 32 which is revolubly mounted in a bearing provided in the casing 12 and has secured upon its outer end the shifting handle 33. The end of the lever 31 is provided with notches 34 and 35 for the reception of the point of the clutch detent 36; said detent is slidably mounted in the boss 37 provided on the casing 12 and is normally pressed toward the right, (see Fig. 5), by the spring 38.

The index pin 39 is slidably mounted in a hole provided in the cover 40 of the casing 12 and the end of said pin is located to enter either of the index holes 41—41 in the collar 23 for a purpose hereinafter explained.

The pin 39 is provided with a notch 42 which engages with the end of the spring 43 and serves to hold the pin 39 in the raised position as shown in Figs. 1, 3 and 4.

The shaft 20 is provided with a T end 44, preferably formed integrally therewith. Said T end is embraced by the sides of the slot 45 formed in the pintle 46 on one end of the clothes container 47. The pintle 46 is revolubly mounted in a U shaped bearing 48 secured by bolts such as 49 to the stuffing box 15. A U shaped bearing similar to 48 is to be secured to the other side of the suds container and a suitable pintle mounted on the other end of the clothes container 47 is to be revolubly mounted therein.

The operation of my improved clutch mechanism is as follows:—

The handle 33 being in the position shown in Fig. 5 the pins 27 will be removed from the holes in the gear 24; consequently, when the shaft 25 is revolved the gear 24 will not be moved.

It is to be noted that when the handle 33 is in the position shown in Fig. 5, the pin 39 may occupy the position shown in Figs. 5, 6 and 8, in which position the pin 39 enters within one of the holes 41 in the index collar 23 and prevents turning of the clothes container 47.

It is also to be noted that when the pin 39 is in the position shown in said figures, by reason of its relation to the face 50 of the slot cut in the shaft 32, the latter cannot be moved, the pins 27 cannot be shifted and power cannot be applied to the clothes container 47.

When it is desired to revolve the clothes container 47, the operator pulls the index pin 39 upwardly, thus removing its end from one of the holes 41 in the collar 23. The pin 39 is to be raised until the end of the spring 43 engages with the notch 42 and stops further upward motion. When the pin 39 is moved to the position shown in Fig. 4, it is removed from the path of the face 50; consequently, the handle 33 can be moved from the position shown in Fig. 5 to the position shown in Fig. 4. This movement of the handle 33 will move the clutch sleeve 28 from the position shown in Fig. 5 to the position shown in Fig. 4 and the pins 27 will be introduced within the holes in the gear 24, thus locking the latter in driving relation to the shaft 25; consequently, the gear 24 will drive the gear 22 and the clothes container will be revolved.

When it is desired to stop the clothes container, the operator moves the handle 33 from the position shown in Fig. 4 to the position shown in Fig. 5, thus removing the pins 27 from the holes in the gear 24 and terminating the driving relations between the latter and the shaft 25. At the same time the operator pushes downwardly upon the pin 39, thus bringing the same upon the cylindrical surface of the collar 23, and as soon as one of the holes 41 therein comes opposite said pin, said pin will enter into said hole and stop the motion of the clothes container.

It is to be noted that the holes 41 are located so that the doors, (not shown), in the clothes container will be directed so that the operator may have access to the interior thereof.

It is to be noted by reference to Fig. 4 that when the handle 33 is in the position shown in Fig. 4 the face 50 is in the path of the pin 39 and, consequently, said pin cannot be brought into engagement with the holes in the collar 23. By this means, I avoid any possibility of fracture of parts by the introduction of said pins within one of said holes while the clothes container is revolving.

It is also to be noted that the point of the clutch detent 36 engages with either of the notches 34 or 35 and holds the handle 33 in either the power applying or the off position, respectively.

Thus it will be seen that I provide a simple, cheap and efficient clutch mechanism for controlling the application of power to the clothes container of a washing machine and for stopping said container in definite positions.

While I have shown my improved clutch mechanism as applied to the clothes container of a washing machine, it is to be understood that I do not desire to be limited to said application thereof. It may be applied in any position where its functions may be found useful.

Hence, unless specifically claimed, I do not desire to be limited to its application in a washing machine.

While I have shown one combination of elements for furnishing improved results, it is to be understood that many changes may be made therein without departing from the spirit of my invention.

I claim:—

1. In a clutch mechanism, the combination with a shaft, a gear revolubly mounted thereon and a sleeve slidably mounted thereon, of means driven by said shaft and moved by said sleeve to engagement with said gear or to disengagement therefrom, a handle for moving said sleeve, a shaft driven by said gear, an index collar comprising an index hole mounted upon said last named shaft, an independently operated index pin movable into said hole to lock said last named shaft against rotation and means for preventing the introduction of said pin into said hole when said first named means is in engagement with said gear.

2. In a clutch mechanism, the combination with a shaft, a gear revolubly mounted thereon and a sleeve slidably mounted thereon, of means driven by said shaft and moved by said sleeve to engagement with said gear or to disengagement therefrom, a handle for moving said sleeve, a shaft driven by said gear, an index collar comprising an index hole mounted upon said last named shaft, an independently operated index pin movable into said hole to lock said last named shaft against rotation and means for preventing the engagement of said first named means with said gear when said pin is in said hole.

3. In a clutch mechanism, the combination with a shaft having a T end, driving mechanism, means for engaging said shaft with said driving mechanism and for disengaging it therefrom, an independently operated pin for engaging said shaft to lock it in definite positions, and means for preventing the engagement of said pin with said shaft when said shaft is engaged with said driving mechanism.

4. In a clutch mechanism, the combination with a shaft having a T end, driving mechanism, means for engaging said shaft with said driving mechanism and for disengaging it therefrom, an independently operated pin for engaging said shaft to lock it in definite positions, and means for preventing the engagment of said shaft with said driving mechanism when said pin is engaged with said shaft.

5. In a clutch mechanism, the combination with a U shaped bearing, a shaft having a T head extending into said bearing and a pintle revolubly mounted in said bearing, of faces in said pintle embracing the limbs of said T head, means for revolving said shaft and means for stopping said shaft with the limbs of said T head parallel to the sides of said U shaped bearing.

6. In a clutch mechanism, the combination with driven, driving and shifting shafts, a casing comprising bearings for said shafts, a fixed gear on said driven shaft and a loose gear on said driving shaft, means operated by said shifting shaft for engaging said loose gear with said driving shaft and a pin for engaging said driven shaft to stop same and for also engaging said shifting shaft to prevent movement of the same when said pin is in engagement with said driven shaft.

7. In a clutch mechanism, the combination with driven, driving and shifting shafts, a casing comprising bearings for said shafts, a fixed gear on said driven shaft and a loose gear on said driving shaft, means operated by said shifting shaft for engaging said loose gear with said driving shaft and a pin for engaging said driven shaft to stop same, said shifting shaft engaging said pin to prevent its movement when said loose gear is engaged with said driving shaft.

In testimony whereof, I affix my signature.

GEORGE SLIDER.